United States Patent [19]

Buij et al.

[11] Patent Number: 5,689,675
[45] Date of Patent: Nov. 18, 1997

[54] RANKING-BASED ADDRESS ASSIGNMENT IN A MODULAR SYSTEM

[75] Inventors: Arnold W. Buij; Marcel Beij, both of Eindhoven, Netherlands

[73] Assignee: U.S. Philips Corporation, New York, N.Y.

[21] Appl. No.: 346,945

[22] Filed: Nov. 29, 1994

[30] Foreign Application Priority Data

Nov. 29, 1993 [EP] European Pat. Off. ............... 93203330

[51] Int. Cl.[6] ............................. G06F 12/06; H04Q 1/00
[52] U.S. Cl. ...................................... 395/405; 340/825.07
[58] Field of Search ...................... 395/405; 340/825.52, 340/825.07, 825.53

[56] References Cited

U.S. PATENT DOCUMENTS

| | | | |
|---|---|---|---|
| 4,253,087 | 2/1981 | Saal | 340/825.52 |
| 4,667,193 | 5/1987 | Cotie et al. | 340/825.08 |
| 5,276,442 | 1/1994 | Cree | 340/825.52 |
| 5,283,571 | 2/1994 | Yang | 340/825.52 |
| 5,327,534 | 7/1994 | Hutchison | 395/200.1 |
| 5,463,755 | 10/1995 | Dumarot | 395/475 |
| 5,502,438 | 3/1996 | Blevin | 340/825.52 |
| 5,513,331 | 4/1996 | Pawlowski | 395/401 |
| 5,526,489 | 6/1996 | Nilakantan | 395/200.02 |

FOREIGN PATENT DOCUMENTS

| | | | |
|---|---|---|---|
| 0493905 | 7/1992 | European Pat. Off. | H04L 12/24 |
| 0537814 | 4/1993 | European Pat. Off. | |
| 4256150 | 9/1992 | Japan | |

OTHER PUBLICATIONS

International Search Report Dated May 3, 1995.

*Primary Examiner*—Tod R. Swann
*Assistant Examiner*—Christopher S. Chow
*Attorney, Agent, or Firm*—Debra K. Stephens

[57] ABSTRACT

A control system comprises modules, and control means to control assignment of addresses to the modules. Each particular module has a particular number. The control means iteratively determines which one of the modules has an extreme one among the particular numbers. Each module is stimulated to conditionally respond if its particular number lies within a certain range. The range is altered until the module with the extreme is found. This process is repeated for the next lower extreme until all modules have been validated. Addresses are then created and stored in the modules for access during operational use.

5 Claims, 2 Drawing Sheets

5,689,675

RANKING-BASED ADDRESS ASSIGNMENT IN A MODULAR SYSTEM

FIELD OF THE INVENTION

The invention relates to a control system comprising a plurality of modules, each particular one thereof including identification means for representing a particular number. The system further includes control means being operative to control assignment of respective addresses to respective ones of the modules for access to the modules, an assignment of the respective addresses to respective ones of the modules being carried out on the basis of the particular numbers.

BACKGROUND ART

Several methods are known in the art to assign addresses to modules in a system. Some examples are given below.

European Patent Application EP-A 0 537 814 (PHN 13.825) discloses a communication system wherein the modules are interconnected via a bus for data communication. Address assignment is accomplished uniformly for each particular module by setting its address to an initial address value and checking if another module has an address with the same initial address value. If there is another module with the same address value, then the address value of the particular module is iteratively incremented until the address value is confirmed to be unique.

Japanese Patent Abstract Publication Kokai 4-256150 discloses an individual address setting system comprising a controller and a terminal device. The terminal device comprises a random number generator to produce a temporary address. The temporary address is stored in the terminal device and communicated to the controller via a transmission timing signal supplied by a timer in the terminal device. The controller has an address-deciding circuit that produces permanent addresses in the order of lower values of the temporary addresses received. The produced permanent address is stored in the controller and is communicated to the terminal device for thereupon being stored in the terminal device as its new address for operational use.

A disadvantage of the system in aforesaid Kokai 4-256150 is that the random-valued temporary addresses are individually transmitted to the controller for storage and for thereupon creating the permanent addresses. If the range of possible random values is large, the transmission channel from the terminal device to the controller should be suitable to transmit large numbers, which either requires a wide bus or a long transmission cycle or both.

OBJECTS OF THE INVENTION

It is an object of the invention to provide a system of the kind specified in the preamble, wherein the address assignment procedure renders the system considerably simpler to implement, simpler to extend or simpler to modify than the prior art systems. It is a further object to furnish such a system wherein the address assignment procedure uses an essentially simpler communication procedure than in the prior art. It is a further object to provide such a system wherein execution of the address assignment procedure requires less hardware than in the prior art. It is a further object to create such a system, wherein the address assignment procedure is essentially faster than the prior art procedures.

SUMMARY OF THE INVENTION

To this end, the invention provides a system of the kind introduced in the preamble, characterized in that the control means is operative to perform following operations. A plurality of mutually exclusive ranges is determined, each containing a single one of the particular numbers. The ranges are determined by stimulating each respective one of the modules to respond if its respective particular number lies in a specific range of numbers. The specific range is altered if none or more than one of the modules responds. Thereupon, the respective addresses are specified on the basis of the specific ranges found and the assignment is carried out.

Thus, an inventory of the system is made by determining how many mutually exclusive ranges have been found, the number of ranges then being equal to the number of modules that need to be individually identified. Note that the inventory is made without transmission of the particular numbers involved. The inventory enables the control means to create the required number of addresses of appropriate width.

For example, the control means is operative to determine the plurality of mutually exclusive ranges by performing following steps. First the control means determines iteratively in which specific one of relevant ones of the modules the identification means represents an extreme one among the particular numbers. This is achieved by stimulating each relevant module to conditionally respond in case its particular number lies within a certain range and by altering the range until the module with the extreme number is found. Thereupon, the control means functionally disables the specific one of the modules to respond, and repeats the aforesaid stimulating and disabling operations until the plurality of modules have been validated. The control means creates the respective addresses and transmits the respective addresses to the respective ones of the modules to have them stored for access in operational use later on.

The control means may be operative to functionally enable one or more particular modules previously disabled to repeat the operations, e.g., in case of detecting a system failure.

The particular number may be programmed in the module during manufacturing. For example, it may include the serial number that is unique for each individual module. Alternatively, the identification means of a respective module comprises a random number generator for producing a respective random number. The particular number of the respective module then is determined by the respective random number. The control means are operative to activate the random number generator at the beginning of the address assigning. Especially when the range of possible random numbers is large in order to reduce the chance on duplication among the modules, the system of the invention has the advantage over the prior art of avoiding communication of large numbers to the control means.

In case each module comprises a random number generator, it may still occur that two or more modules happen to produce the same random number. The control means then will get a response of these modules simultaneously. If the control means identifies this event, the complete assignment procedure is executed once more.

The system in the invention can easily be re-configured. The address assignment procedure is uniform for all kind of systems irrespective of the number of modules in the system. The invention is suitable for any modular system. The modules need not be functionally uniform, as long as each module is suited to be subjected to the address assignment procedure of the invention. The aforesaid control means for address assignment can be integrated, physically or functionally, with further control means for control of the operational use of the modules. The concept of the invention is illustrated by some non-limitative examples discussed below.

In a first example, the system includes a lighting system with a plurality of modules, wherein each module is a luminaire provided with some information processing features. Each luminaire is individually controllable through instructions with regard to, e.g., light intensity, panning and tilting, colour, etc. Also, the operational status of each individual one of the luminairies can selectively be requested by addressing the relevant ones of the luminairies using a specific instruction. The control means and the modules preferably are provided with means for infra-red communication, e.g., via the RC-5 protocol.

In a second example, the system includes the user-controllable electric equipment of a motor car. Apart from the standard equipment, the buyer can order particular optional accessories that are built-in off factory, such as airconditioning, audio equipment, electrically powered windows, electrically powered seats, etc. The electric equipment is made controllable through interfaces to a bus system capable of serving all possible accessories. The invention comes in handy for the manufacturer when offering a wide range of models that each come with different combinations of accessories. Adjusting the addresses and the address domain is accomplished uniformly for each combination of accessories. Also, when the equipment is extended later on, the invention considerably simplifies installation.

In a third example, the system includes a collection of appliances, such as kitchen apparatuses, heating, airconditioning, audio equipment, video equipment, all centrally controllable in a domestic environment. In case of a replacement or extension, the control is easily modified by assignment of new addresses according to the invention.

Note that the functionalities of the control means may be partly or entirely be implemented in software.

BRIEF DESCRIPTION OF THE DRAWING

The invention is explained by way of example and with reference to the accompanying drawing, wherein.

DETAILED DESCRIPTION OF THE PREFERRED EMBODIMENTS

BLOCK DIAGRAM

Figure 1:
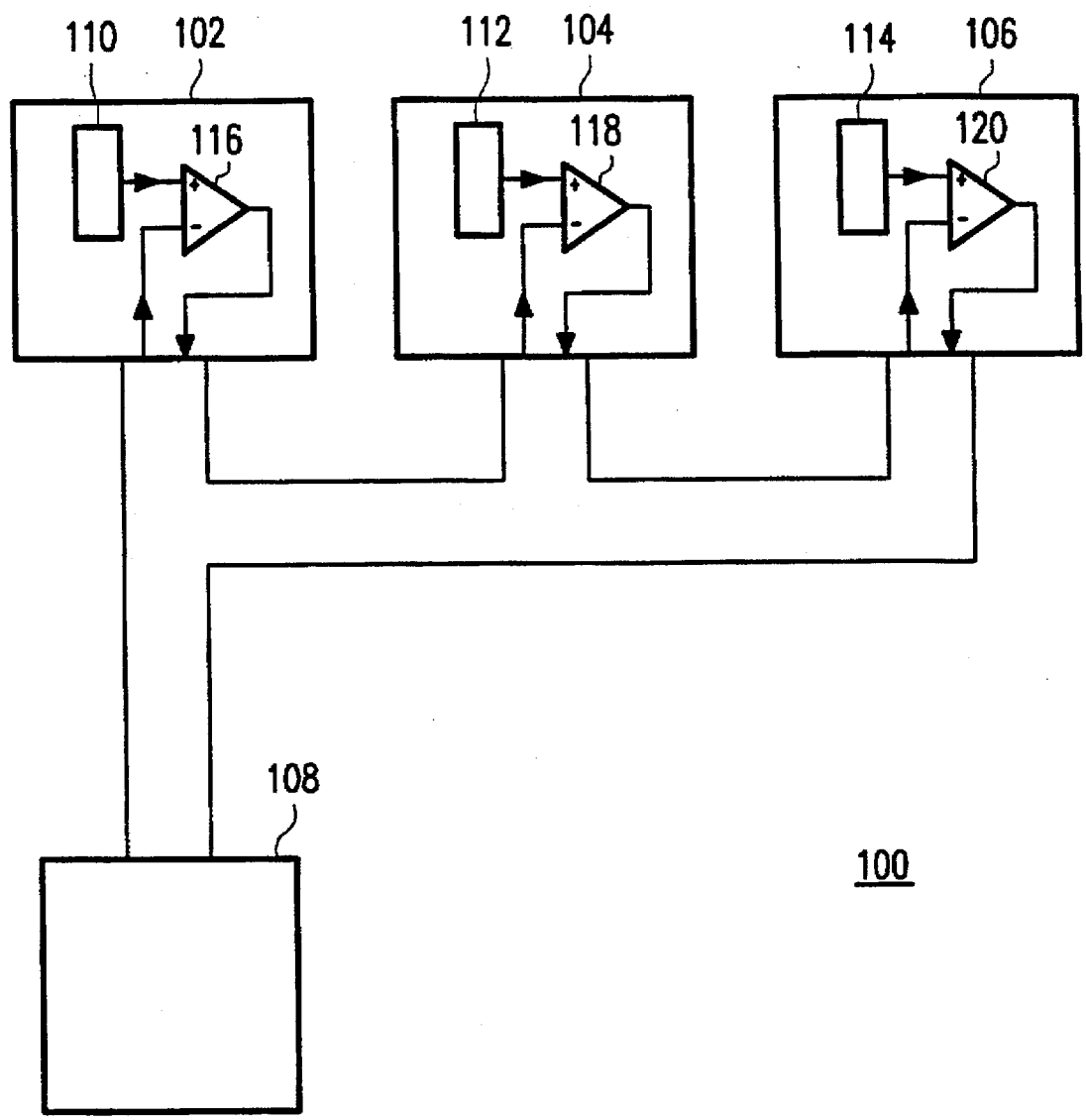
FIG. 1 shows a block diagram for a control system in the invention.

FIG. 1 shows a block diagram for a control system 100 in the invention. System 100 comprises a plurality of modules 102, 104 and 106, and control means 108 to control the assignment of respective unique addresses to modules 102–106 for access of modules 102–106 during their operational use. Modules 102–106 are, for example, appliances in a domestic environment that are governed via a hard-wired bus or via ultrasound, or luminairies in a residential environment that are controlled via infra-red communication, e.g., via the RC-5 protocol, data processing modules in a data processing system whose configuration is modifiable, or information communication units that can be used in modifiable network configurations, etc. The details of the appropriate communication interface between modules 102–106 on the one hand and control means 108 on the other hand are not shown separately in order to not obscure the drawing.

In operational use, each of modules 102–106 is to be unambiguously identified through a respective unique address for control of the module's operation, wherein, e.g., the appropriate instruction is to be delivered at the correct module. The invention relates to the assignment of these addresses. Each of modules 102–106 includes a random number generator 110, 112 and 114, respectively. Control means 108 is operative to initialize generators 110–114 by transmitting an initialization instruction. In response to the initialization instruction, generators 110–114 produce mutually unrelated random or pseudo-random numbers.

When generators 110–114 have produced a random number each, control means 108 is operative to interrogate modules 102–106 for determining a ranking of modules 102–106 according to the number produced. To this end, control means 108 conducts a search by transmitting a first search number to all modules 102–106 for comparison to the respective random numbers produced in the respective modules. The first search number bisects the range of possible values of the produced random numbers in a first interval and a second interval. For example, the first interval contains all values lower than or equal to the value of the search number and the second interval contains all values higher than the value of the search number; or the first interval contains all values lower than the value of the search value and the second interval contains all values equal to and higher than the value of the search number.

Each particular one of modules 102–106 then compares the received first search number with the produced random number. To indicate this, comparators 116, 118 and 120 are functionally included in modules 102, 104 and 106, respectively. The particular one of modules 102–106 will only send a response to control means 108 upon receiving the first search number, if the random number produced by the generator of the particular module lies in a pre-specified one of the first and second intervals. For the sake of clarity, it is assumed that a module responds if the search value is larger than the produced random number. It is further assumed that in the example discussed here, the random number produced by module 102 is the lowest, the random number produced by module 106 is the highest and the random number produced by module 104 lies in between.

Scanning the range of search numbers for the first time from low search values to high search values identifies module 102 having a random number with an extreme (in this example: lowest) value. Control means 108 thus is capable of identifying module 102 by transmitting a search value equal to or larger than the lowest random value but smaller than the random value produced by module 104. Upon reception of the response from module 102, control means stores information that associates the current search value with the module having the lowest search value. Then, control means 108 renders module 102 insusceptible to the transmission of further search values by transmitting a special instruction acceptable by module 102 only. For example, the special instruction is rendered acceptable only by module 102 when the instruction contains data representative of the current search value that is known to have triggered the response from module 102 only.

Control means 108 proceeds by incrementing the search value until another one of modules 102–106 responds, namely module 104, as having the lowest random value of the remaining modules. Control means 108 associates the current search value with another one of the modules, renders this one, i.e., module 104, insusceptible to the transmission of other search values and proceeds by incrementing the search value until the next one of the modules, here module 106, will respond. Control means 108 associates the current search value with a third one of the modules, renders it insusceptible to the transmission of further search values and continues the search for the remaining modules.

Since there are no further modules present in this example, the search value will be incremented until it reaches its upper limit without control means 108 getting a further response. Reaching this upper limit implies that the making up of an inventory is terminated. Control means thereafter determines how many modules (here: three) have responded during the quest and creates an address for each of them. As modules 102–106 can be discriminated on the basis of the associated search values ranges, each can be individually accessed with an instruction containing a specific address to be stored in the module for access during operational use later on.

Modules 102–106 may be provided with respective identification means other than random value generators. For example, elements 110–114 may each comprise a memory that is programmed during manufacturing of the modules to store, for example, a serial number which is unique for each module. Making up an inventory of the modules present in the system then proceeds basically as discussed above, the step of producing the random number being replaced by making available the stored unique number.

FLOW DIAGRAM

Figure 2:
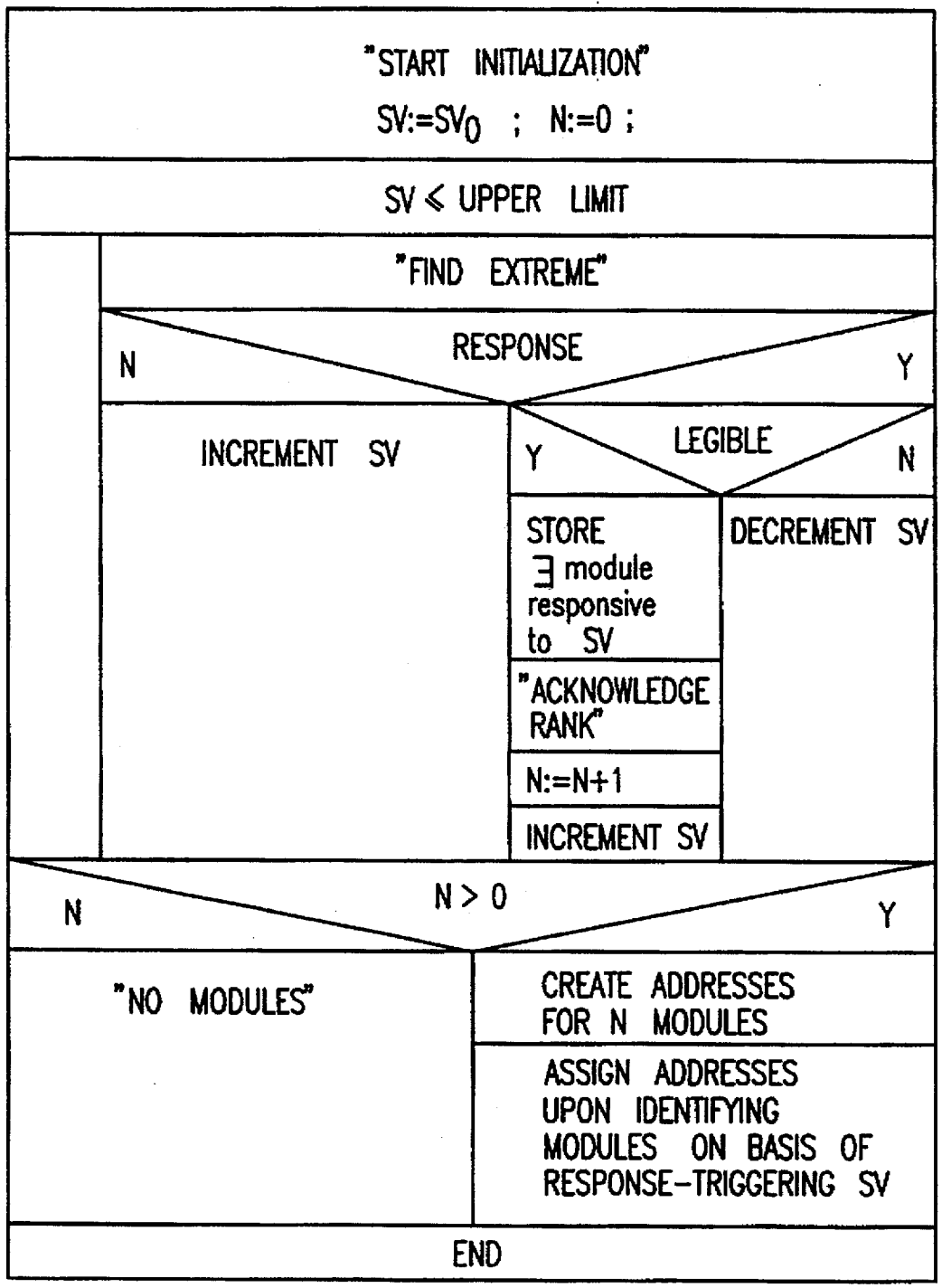
FIG. 2 shows a flow diagram for explanation of the address assignment procedure.

FIG. 2 gives a diagram 200 to explain an example of the address assignment procedure in the system of the invention.

The control means in the system of the invention transmits a general instruction "START INITIALIZATION" to all participating modules. At reception of this instruction, all modules select a number at random of, e.g., 16 bits wide. Also at this stage, the initial magnitude of the search value $SV_i$ is set to be $SV_{i=0}$, and the number N of modules identified so far is set to zero.

Alternatively, the procedure may use a "START INITIALIZATION" instruction to initialize the search value $SV_i$ and the number N, and a separate instruction "RANDOMIZE" for activating the modules to produce a random number. Functionally disconnecting the initialization of the search value $SV_i$ and of the number N from the creation of random values may come in handy, for instance, when recreating addresses on the basis of the same random numbers, thereby skipping the process step of creating random numbers.

As long as the search value $SV_i$ is smaller than an upper limit, the procedure proceeds as follows. The control means transmits a general instruction "FIND EXTREME" to the participating modules. The "FIND EXTREME" instruction includes the current search value. All participating modules that have produced a random number that is equal to or smaller than the search value respond by transmitting a "CONFIRM" to the control means. The following events are discriminated: there is no response at all; there is a response that is legible; there is a response that is illegible.

If there is no response at all, then the search value $SV_i$ used was too small. If the search value $SV_i$ has not yet reached its upper limit, then the search value $SV_i$ has to be incremented and the control means have to transmit a new "FIND EXTREME" instruction with an updated search value $SV_{i+m}$, wherein the magnitude of the integer m determines the size of the increment. As long as there is no response by any module, and as long as the search value has not reached its upper limit, the search value is incremented repetitively. Preferably, the increment here is large initially in order to rapidly find at least one responding module.

If only one of the modules responds, the response is legible. The value of the random number of the responding module is then known to be the lowest among the random numbers produced by all modules not yet examined. The control means may continue in order to determine the exact value of the random number, e.g. by adjusting the search value and conducting a binary search. Alternatively, the control means may associate the current search value to the responding module. This suffices for temporary identification of the responding module as it was the only one whose response was triggered by the current search value. For example, an indication is stored that there is a module present responding to the current search value. In order to rank the remaining modules according to a similar procedure, the module currently found responding must be silenced. This is achieved by the control means transmitting an "ACKNOWLEDGE RANK" instruction including, e.g., the random number found or the current search value for identification. The relevant module thereupon transmits a further "CONFIRM" and sets itself into a state insusceptible to next "FIND EXTREME" instructions regardless of the search values used. The insusceptibility to any search value has an advantage in that uniform search strategies can be employed for each module to find the next. The number of identified modules N is incremented by unity and the search value is incremented to scan for further modules.

If more than one module transmits a "CONFIRM", there are two possibilities for the control means to interpret the response: either the control means registers an "illegible" response or a "legible" response. The response is "illegible" due to interference between concurrent transmissions of the modules, in the same way as a response of a single module is "illegible" owing to the transmission being disturbed by a source external to the system. The response is "legible" in case the two "CONFIRM" signals are received exactly in synchronism. The synchronism can either be accidental or on purpose.

In case of uncontrollable propagation delays between the system's elements, e.g., the modules and the control means, and of tolerances in hardware properties, such as baud-rates and carrier frequencies, the synchronism is accidental and rarely occurs. If more than one module responds and if the control means decides the received signals to be "illegible", then the current search value $SV_i$ is to be decremented to $SV_{i-k}$, repetitively if needed, until there is a legible response. The magnitude of integer k determines the size of the decrement. Preferably, the decrement is smaller than the increment determined by the integer m discussed above, as the search value is now located within a capturing range.

The synchronized reception of two or more "CONFIRM" signals could on the other hand be made intentional. In this case, the communication medium and the system tolerances then permit the use of modules that are designed to synchronize their transmissions. As a consequence, the control means cannot discriminate between the response from a single module and synchronized responses from a multitude of modules. In either case, the control means interprets the received message as "legible". The current search value $SV_i$ then is to be decremented until no response is received. Under the (reasonable) assumption that there are no two modules with the same random number, the lastly used search value giving rise to a response identifies a single module, namely, the one that has the lowest random number among the participating modules. The synchronized system has the advantage that a disturbance generated externally to the system can be identified on the basis of an "illegible" response occurring. The control means then can repeat the "FIND EXTREME" instruction with the same search value to continue the procedure.

Above procedure is repeated until the search value exceeds a predetermined upper value. Thereupon, the number N of identified modules is read. If N equals zero, then there are no modules present that fall within the range of the search value. If N is larger than zero, at least one module has been identified. Now, addresses are created, the largest of which having a width that preferably is the shortest possible to represent the number N. These addresses then are transmitted to the modules for storage. Note that each module that has been taken account of in the procedure can be identified on the basis of the associated search value, as mentioned above. The modules now are provided with addresses for access during operational use.

Several decrement and increment strategies are possible to rapidly find a desired search value. A binary search, for example, may be used, each time bisecting an interval of interest and determining with which one of the two parts to continue. One could also just decrement and increment by unity, which simplifies both hardware and software, but which takes a longer time to execute.

What is claimed is:

1. A control system comprising:

a plurality of modules, each particular module including identification means for representing a particular number to enable identification of the particular module;

control means being operative to control assignment of respective addresses to respective modules of the plurality of modules for access to the plurality of modules and being operative to carry out an assignment of the respective addresses to respective modules of the plurality of modules on the basis of the particular numbers, said control means being operative to perform the steps of:

a) determining a plurality of mutually exclusive number ranges, each respective one containing a respective single number of the particular numbers, the determining including:

i) stimulating each respective module of the modules to respond if its respective particular number lies in a specific range of numbers without the respective module transmitting its particular number; and ii) altering the specific range if none or more than one of the modules responds; and b) specifying the respective addresses on the basis of the specific ranges found and carrying out the assignment.

2. The system of claim 1, wherein the control means is operative to determine the plurality of mutually exclusive ranges by performing the following steps:

c) determining iteratively in which specific module of relevant modules the identification means represents an extreme one among the particular numbers by means of stimulating each relevant module to conditionally respond in case its particular number lies within a certain range and altering the range until the module with the extreme number is found;

d) functionally disabling the specific one of the modules to respond; and e) repeating steps c) and d) until the plurality of modules have been validated.

3. The system of claim 1, wherein the identification means of a respective module comprises a random number generator for producing a respective random number, and wherein a respective one of the particular numbers is determined by the respective random number.

4. The system of claim 3, wherein the control means is operative to activate the random number generator.

5. The system of claim 1, wherein each respective one of the modules comprises a memory for storage of the respective address.

* * * * *